(12) United States Patent
Fisher

(10) Patent No.: US 8,805,726 B2
(45) Date of Patent: Aug. 12, 2014

(54) ONLINE SHOPPING USING NFC AND A MOBILE DEVICE

(71) Applicant: Blaze Mobile, Inc., Berkeley, CA (US)
(72) Inventor: Michelle Fisher, Oakland, CA (US)
(73) Assignee: Michelle Fisher, Oakland, CA (US)
( * ) Notice: Subject to any disclaimer, the term of this patent is extended or adjusted under 35 U.S.C. 154(b) by 0 days.
(21) Appl. No.: 13/710,441
(22) Filed: Dec. 10, 2012

(65) Prior Publication Data
US 2013/0103478 A1    Apr. 25, 2013

Related U.S. Application Data
(63) Continuation of application No. 11/948,903, filed on Nov. 30, 2007, now Pat. No. 8,352,323.

(51) Int. Cl.
| | | |
|---|---|---|
| G06Q 20/00 | (2012.01) | |
| H04B 1/38 | (2006.01) | |
| G06Q 20/40 | (2012.01) | |
| G06Q 20/32 | (2012.01) | |
| G06Q 20/10 | (2012.01) | |
| G06Q 30/06 | (2012.01) | |
| G06Q 30/02 | (2012.01) | |
| G06Q 20/20 | (2012.01) | |
| G06Q 20/16 | (2012.01) | |
| G06Q 20/38 | (2012.01) | |
| G06Q 20/36 | (2012.01) | |
| H04N 21/81 | (2011.01) | |
| H04W 4/00 | (2009.01) | |
| G06Q 40/00 | (2012.01) | |
| G07F 7/10 | (2006.01) | |

(52) U.S. Cl.
CPC ........... *G06Q 20/204* (2013.01); *G06Q 20/409* (2013.01); *G06Q 20/32* (2013.01); *G06Q 20/108* (2013.01); *G06Q 30/06* (2013.01); *H04N 21/812* (2013.01); *H04W 4/008* (2013.01); *G06Q 20/4012* (2013.01); *G06Q 20/40* (2013.01); *G06Q 30/02* (2013.01); *G06Q 20/4014* (2013.01); *G06Q 20/322* (2013.01); *G06Q 30/0238* (2013.01); *G06Q 20/16* (2013.01); *G06Q 20/20* (2013.01); *G06Q 20/3227* (2013.01); *G06Q 40/00* (2013.01); *G07F 7/1008* (2013.01); *G06Q 20/202* (2013.01); *G06Q 20/3821* (2013.01); *G06Q 20/206* (2013.01); *G06Q 20/00* (2013.01); *G06Q 30/0222* (2013.01); *G06Q 40/10* (2013.01); *G06Q 20/3278* (2013.01); *G06Q 20/3226* (2013.01); *G06Q 20/3674* (2013.01)
USPC ............... 705/16; 705/30; 705/35; 705/39; 705/40; 705/41; 455/410; 455/411; 455/414.1; 455/558; 455/566

(58) Field of Classification Search
CPC ..... G06Q 20/102; G06Q 20/10; G06Q 40/10; G06Q 40/00; H04W 12/12; H04W 12/06
USPC .............. 455/558, 410, 411, 550, 566, 414.1; 340/10.1; 705/40, 41, 72, 30, 35, 39
See application file for complete search history.

(56) References Cited

U.S. PATENT DOCUMENTS

| | | | |
|---|---|---|---|
| 6,038,367 A | | 3/2000 | Abecassis |
| 6,101,483 A | * | 8/2000 | Petrovich et al. ................ 705/21 |

(Continued)

FOREIGN PATENT DOCUMENTS

| | | | |
|---|---|---|---|
| WO | WO 2006095212 A1 | 9/2006 | |
| WO | WO 2006095212 A1 * | 9/2006 | ............ H04M 11/00 |

OTHER PUBLICATIONS

U.S. Appl. No. 11/933,337, Office Action mailed May 27, 2010, 9 p.

(Continued)

*Primary Examiner* — Olusegun Goyea

(57) ABSTRACT

A method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

16 Claims, 4 Drawing Sheets

(56) References Cited

U.S. PATENT DOCUMENTS

| | | | |
|---|---|---|---|
| 6,115,601 A * | 9/2000 | Ferreira | 455/406 |
| 6,123,259 A * | 9/2000 | Ogasawara | 235/380 |
| 6,128,655 A | 10/2000 | Fields | |
| 6,141,666 A | 10/2000 | Tobin | |
| 6,199,082 B1 | 3/2001 | Ferrel | |
| 6,250,557 B1 * | 6/2001 | Forslund et al. | 235/492 |
| 6,415,156 B1 | 7/2002 | Stadelmann | |
| 6,450,407 B1 * | 9/2002 | Freeman et al. | 235/492 |
| 6,587,835 B1 * | 7/2003 | Treyz et al. | 705/14.64 |
| 6,605,120 B1 | 8/2003 | Fields | |
| 6,771,981 B1 | 8/2004 | Zalewski | |
| 6,772,396 B1 | 8/2004 | Cronin | |
| 6,886,017 B1 | 4/2005 | Jackson | |
| 6,950,939 B2 | 9/2005 | Tobin | |
| 7,031,945 B1 | 4/2006 | Donner | |
| 7,069,248 B2 | 6/2006 | Huber | |
| 7,096,003 B2 | 8/2006 | Joao | |
| 7,110,744 B2 | 9/2006 | Freeny | |
| 7,110,792 B2 * | 9/2006 | Rosenberg | 455/558 |
| 7,127,236 B2 | 10/2006 | Khan | |
| 7,200,578 B2 * | 4/2007 | Paltenghe et al. | 705/74 |
| 7,289,810 B2 | 10/2007 | Jagadeesan | |
| 7,308,254 B1 | 12/2007 | Rissanen | |
| 7,357,312 B2 | 4/2008 | Gangi | |
| 7,379,920 B2 | 5/2008 | Leung | |
| 7,383,226 B2 * | 6/2008 | Kight et al. | 705/40 |
| 7,472,829 B2 | 1/2009 | Brown | |
| 7,482,925 B2 | 1/2009 | Hammad | |
| 7,512,567 B2 * | 3/2009 | Bemmel et al. | 705/67 |
| 7,522,905 B2 | 4/2009 | Hammad | |
| 7,783,532 B2 * | 8/2010 | Hsu et al. | 705/28 |
| 7,784,684 B2 * | 8/2010 | Labrou et al. | 235/380 |
| 7,818,284 B1 * | 10/2010 | Walker et al. | 705/26.2 |
| 7,827,056 B2 * | 11/2010 | Walker et al. | 705/14.23 |
| 7,870,077 B2 * | 1/2011 | Woo et al. | 705/78 |
| 7,979,519 B2 * | 7/2011 | Shigeta et al. | 709/223 |
| 8,005,426 B2 * | 8/2011 | Huomo et al. | 455/41.2 |
| 8,019,362 B2 * | 9/2011 | Sweatman et al. | 455/466 |
| 8,073,424 B2 * | 12/2011 | Sun et al. | 455/406 |
| 8,086,534 B2 * | 12/2011 | Powell | 705/44 |
| 8,109,444 B2 * | 2/2012 | Jain | 235/492 |
| 8,121,945 B2 | 2/2012 | Rackley | |
| 8,127,984 B2 * | 3/2012 | Zatloukal et al. | 235/380 |
| 8,214,454 B1 * | 7/2012 | Barnes et al. | 709/217 |
| 8,429,030 B2 * | 4/2013 | Walker et al. | 705/26.7 |
| 8,429,031 B2 * | 4/2013 | Walker et al. | 705/26.7 |
| 8,438,077 B2 * | 5/2013 | Walker et al. | 705/26.7 |
| 8,438,078 B2 * | 5/2013 | Walker et al. | 705/26.7 |
| 2001/0011250 A1 | 8/2001 | Paltenghe et al. | 705/41 |
| 2001/0044751 A1 * | 11/2001 | Pugliese et al. | 705/26 |
| 2002/0056091 A1 * | 5/2002 | Bala et al. | 725/34 |
| 2002/0059100 A1 | 5/2002 | Shore | |
| 2002/0063895 A1 | 5/2002 | Agata | |
| 2002/0065774 A1 * | 5/2002 | Young et al. | 705/41 |
| 2002/0077918 A1 | 6/2002 | Lerner | |
| 2002/0082879 A1 | 6/2002 | Miller | |
| 2002/0107756 A1 | 8/2002 | Hammons | |
| 2002/0116269 A1 * | 8/2002 | Ishida | 705/14 |
| 2002/0160761 A1 * | 10/2002 | Wolfe | 455/414 |
| 2002/0169664 A1 * | 11/2002 | Walker et al. | 705/14 |
| 2002/0169984 A1 | 11/2002 | Kumar | |
| 2003/0061113 A1 * | 3/2003 | Petrovich et al. | 705/26 |
| 2003/0065805 A1 | 4/2003 | Barnes | |
| 2003/0066883 A1 * | 4/2003 | Yu | 235/382 |
| 2003/0074259 A1 * | 4/2003 | Slyman et al. | 705/14 |
| 2003/0085286 A1 * | 5/2003 | Kelley et al. | 235/492 |
| 2003/0087601 A1 * | 5/2003 | Agam et al. | 455/39 |
| 2003/0093695 A1 | 5/2003 | Dutta | |
| 2003/0105641 A1 | 6/2003 | Lewis | |
| 2003/0132298 A1 * | 7/2003 | Swartz et al. | 235/472.02 |
| 2003/0140004 A1 | 7/2003 | O'Leary | |
| 2003/0163359 A1 * | 8/2003 | Kanesaka | 705/8 |
| 2003/0172028 A1 | 9/2003 | Abell | |
| 2004/0006497 A1 | 1/2004 | Nestor | |
| 2004/0030658 A1 | 2/2004 | Cruz | |
| 2004/0034544 A1 | 2/2004 | Fields | |
| 2004/0064407 A1 * | 4/2004 | Kight et al. | 705/40 |
| 2004/0064408 A1 * | 4/2004 | Kight et al. | 705/40 |
| 2004/0064409 A1 * | 4/2004 | Kight et al. | 705/40 |
| 2004/0064410 A1 * | 4/2004 | Kight et al. | 705/40 |
| 2004/0073497 A1 * | 4/2004 | Hayes et al. | 705/27 |
| 2004/0078329 A1 * | 4/2004 | Kight et al. | 705/40 |
| 2004/0083167 A1 * | 4/2004 | Kight et al. | 705/40 |
| 2004/0093271 A1 * | 5/2004 | Walker et al. | 705/14 |
| 2004/0111320 A1 * | 6/2004 | Schlieffers et al. | 705/16 |
| 2004/0127256 A1 * | 7/2004 | Goldthwaite et al. | 455/558 |
| 2004/0235450 A1 * | 11/2004 | Rosenberg | 455/406 |
| 2004/0243519 A1 | 12/2004 | Perttila | |
| 2004/0254836 A1 * | 12/2004 | Emoke Barabas et al. | 705/14 |
| 2004/0267618 A1 | 12/2004 | Judicibus | |
| 2004/0267665 A1 | 12/2004 | Nam | |
| 2005/0003810 A1 | 1/2005 | Chu | |
| 2005/0040230 A1 * | 2/2005 | Swartz et al. | 235/383 |
| 2005/0043994 A1 * | 2/2005 | Walker et al. | 705/14 |
| 2005/0076210 A1 | 4/2005 | Thomas | |
| 2005/0165646 A1 * | 7/2005 | Tedesco et al. | 705/14 |
| 2005/0187873 A1 * | 8/2005 | Labrou et al. | 705/40 |
| 2005/0215231 A1 | 9/2005 | Bauchot | |
| 2006/0031752 A1 * | 2/2006 | Surloff et al. | 715/501.1 |
| 2006/0089874 A1 * | 4/2006 | Newman et al. | 705/14 |
| 2006/0143091 A1 * | 6/2006 | Yuan et al. | 705/26 |
| 2006/0165060 A1 * | 7/2006 | Dua | 370/352 |
| 2006/0191995 A1 * | 8/2006 | Stewart et al. | 235/379 |
| 2006/0206709 A1 * | 9/2006 | Labrou et al. | 713/167 |
| 2006/0218092 A1 * | 9/2006 | Tedesco et al. | 705/40 |
| 2006/0219780 A1 * | 10/2006 | Swartz et al. | 235/383 |
| 2006/0287920 A1 * | 12/2006 | Perkins et al. | 705/14 |
| 2006/0294025 A1 * | 12/2006 | Mengerink | 705/77 |
| 2007/0004391 A1 | 1/2007 | Maffeis | |
| 2007/0011099 A1 * | 1/2007 | Sheehan | 705/65 |
| 2007/0021969 A1 * | 1/2007 | Homeier-Beals | 705/1 |
| 2007/0022058 A1 * | 1/2007 | Labrou et al. | 705/67 |
| 2007/0095892 A1 | 5/2007 | Lyons | |
| 2007/0125838 A1 * | 6/2007 | Law et al. | 235/379 |
| 2007/0125840 A1 * | 6/2007 | Law et al. | 235/379 |
| 2007/0138299 A1 * | 6/2007 | Mitra | 235/492 |
| 2007/0156436 A1 * | 7/2007 | Fisher et al. | 705/1 |
| 2007/0179883 A1 * | 8/2007 | Questembert | 705/39 |
| 2007/0210155 A1 * | 9/2007 | Swartz et al. | 235/383 |
| 2007/0235519 A1 | 10/2007 | Jang | |
| 2007/0255662 A1 | 11/2007 | Tumminaro | |
| 2007/0270166 A1 * | 11/2007 | Hampel et al. | 455/456.3 |
| 2007/0293155 A1 * | 12/2007 | Liao et al. | 455/41.2 |
| 2008/0004952 A1 * | 1/2008 | Koli | 705/14 |
| 2008/0006685 A1 * | 1/2008 | Rackley, III et al. | 235/379 |
| 2008/0010190 A1 * | 1/2008 | Rackley, III et al. | 705/39 |
| 2008/0010191 A1 * | 1/2008 | Rackley, III et al. | 705/39 |
| 2008/0010192 A1 * | 1/2008 | Rackley, III et al. | 705/39 |
| 2008/0010193 A1 * | 1/2008 | Rackley, III et al. | 705/39 |
| 2008/0010196 A1 * | 1/2008 | Rackley, III et al. | 705/40 |
| 2008/0010204 A1 * | 1/2008 | Rackley, III et al. | 705/45 |
| 2008/0010215 A1 * | 1/2008 | Rackley, III et al. | 705/70 |
| 2008/0017704 A1 * | 1/2008 | VanDeburg et al. | 235/380 |
| 2008/0027795 A1 * | 1/2008 | Medlin et al. | 705/14 |
| 2008/0040265 A1 * | 2/2008 | Rackley, III et al. | 705/40 |
| 2008/0045172 A1 * | 2/2008 | Narayanaswami et al. | 455/187.1 |
| 2008/0046366 A1 | 2/2008 | Bemmel | |
| 2008/0048022 A1 * | 2/2008 | Vawter | 235/380 |
| 2008/0051059 A1 * | 2/2008 | Fisher | 455/410 |
| 2008/0051142 A1 * | 2/2008 | Calvet et al. | 455/558 |
| 2008/0052192 A1 * | 2/2008 | Fisher | 705/26 |
| 2008/0052233 A1 * | 2/2008 | Fisher et al. | 705/40 |
| 2008/0059329 A1 * | 3/2008 | Luchene et al. | 705/26 |
| 2008/0126145 A1 * | 5/2008 | Rackley, III et al. | 705/7 |
| 2008/0133336 A1 * | 6/2008 | Altman et al. | 705/10 |
| 2008/0139155 A1 | 6/2008 | Boireau | |
| 2008/0140520 A1 * | 6/2008 | Hyder et al. | 705/14 |
| 2008/0148040 A1 * | 6/2008 | Machani et al. | 713/150 |
| 2008/0167017 A1 * | 7/2008 | Wentker et al. | 455/414.1 |
| 2008/0167961 A1 * | 7/2008 | Wentker et al. | 705/14 |
| 2008/0167988 A1 * | 7/2008 | Sun et al. | 705/39 |
| 2008/0172274 A1 * | 7/2008 | Hurowitz et al. | 705/8 |
| 2008/0172285 A1 * | 7/2008 | Hurowitz et al. | 705/10 |

(56) References Cited

U.S. PATENT DOCUMENTS

| | | | |
|---|---|---|---|
| 2008/0172291 A1* | 7/2008 | Hurowitz et al. | 705/14 |
| 2008/0172292 A1* | 7/2008 | Hurowitz et al. | 705/14 |
| 2008/0177668 A1 | 7/2008 | Delean | |
| 2008/0207234 A1* | 8/2008 | Arthur et al. | 455/466 |
| 2008/0208681 A1 | 8/2008 | Hammad | |
| 2008/0208743 A1* | 8/2008 | Arthur et al. | 705/41 |
| 2008/0208744 A1* | 8/2008 | Arthur et al. | 705/41 |
| 2008/0208762 A1* | 8/2008 | Arthur et al. | 705/79 |
| 2008/0221997 A1* | 9/2008 | Wolfe | 705/14 |
| 2008/0249938 A1* | 10/2008 | Drake-Stoker | 705/44 |
| 2008/0255947 A1* | 10/2008 | Friedman | 705/14 |
| 2008/0262928 A1* | 10/2008 | Michaelis | 705/14 |
| 2008/0274794 A1* | 11/2008 | Mathieson | 463/25 |
| 2008/0275779 A1* | 11/2008 | Lakshminarayanan | 705/14 |
| 2008/0294556 A1 | 11/2008 | Anderson | |
| 2008/0305774 A1 | 12/2008 | Ramakrishna | |
| 2009/0018913 A1* | 1/2009 | Sarukkai et al. | 705/14 |
| 2009/0061884 A1* | 3/2009 | Rajan et al. | 455/445 |
| 2009/0063312 A1* | 3/2009 | Hurst | 705/30 |
| 2009/0076912 A1* | 3/2009 | Rajan et al. | 705/14 |
| 2009/0098825 A1 | 4/2009 | Huomo | |
| 2009/0104888 A1* | 4/2009 | Cox | 455/410 |
| 2009/0106112 A1* | 4/2009 | Dalmia et al. | 705/14 |
| 2009/0112747 A1* | 4/2009 | Mullen et al. | 705/35 |
| 2009/0124234 A1* | 5/2009 | Fisher et al. | 455/406 |
| 2009/0132362 A1* | 5/2009 | Fisher et al. | 705/14 |
| 2009/0143104 A1* | 6/2009 | Loh et al. | 455/558 |
| 2009/0144161 A1* | 6/2009 | Fisher | 705/16 |
| 2009/0177587 A1* | 7/2009 | Siegal et al. | 705/67 |
| 2009/0227281 A1* | 9/2009 | Hammad et al. | 455/550.1 |
| 2010/0057619 A1* | 3/2010 | Weller et al. | 705/67 |
| 2010/0063895 A1* | 3/2010 | Dominguez et al. | 705/26 |
| 2010/0145835 A1* | 6/2010 | Davis et al. | 705/30 |
| 2010/0312694 A1* | 12/2010 | Homeier-Beals | 705/39 |
| 2011/0055038 A1* | 3/2011 | Mengerink | 705/26.1 |
| 2011/0320316 A1* | 12/2011 | Randazza et al. | 705/26.43 |
| 2012/0030044 A1* | 2/2012 | Hurst | 705/18 |
| 2012/0150744 A1* | 6/2012 | Carlson et al. | 705/44 |
| 2012/0215573 A1* | 8/2012 | Sussman et al. | 705/5 |
| 2012/0220314 A1* | 8/2012 | Altman et al. | 455/456.3 |
| 2012/0265677 A1* | 10/2012 | Rackley et al. | 705/41 |
| 2013/0013501 A1* | 1/2013 | Rackley et al. | 705/41 |
| 2013/0054470 A1* | 2/2013 | Campos et al. | 705/67 |

OTHER PUBLICATIONS

U.S. Appl. No. 11/933,351, Office Action mailed Oct. 3, 2008, 5 p.
U.S. Appl. No. 11/933,367, Office Action mailed May 27, 2010, 8 p.
U.S. Appl. No. 11/467,441, Office Action mailed May 27, 2009, 17 p.
U.S. Appl. No. 12/592,581, Office Action mailed Jun. 4, 2010, 20 p.
U.S. Appl. No. 11/933,351, Office Action mailed Jul. 8, 2009, 7 p.
U.S. Appl. No. 11/939,821, Office Action mailed Aug. 17, 2010, 11 p.
U.S. Appl. No. 11/933,351, Office Action mailed Aug. 18, 2010, 16 p.
U.S. Appl. No. 11/933,321, Office Action mailed May 27, 2010, 11 p.
Deena, M. Amato, "Mobile Rewards." Chain Store Age 82.5 (2006): 160, 161, 163. Hoover's Company Profiles; ProQuest Central. Web. Oct. 5, 2012.
"ViVOtech to Demonstrate Industry's First End-to-End Near Field Communication (NFC) Solution at the NRF Show." Business Wire: 1 Jan. 16, 2006. Business Dateline; Hoover's Company Profiles; ProQuest Central. Web. Oct. 5, 2012.

* cited by examiner

ONLINE SHOPPING USING NFC AND A MOBILE DEVICE

CROSS-REFERENCE TO RELATED APPLICATIONS

This application is a continuation of application Ser. No. 11/948,903, filed Nov. 30, 2007, titled METHOD AND SYSTEM FOR CONDUCTING AN ONLINE PAYMENT TRANSACTION USING A MOBILE COMMUNICATION DEVICE, all of which is incorporated by reference herein in its entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts.

BRIEF SUMMARY OF THE INVENTION

In general, this specification describes a method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

Particular implementations can include one or more of the following features. The point of sale device can be a desktop computer, a laptop computer, or a terminal. The mobile communication device can be a cellular phone, a wireless personal digital assistant (PDA), or a laptop computer. The cellular phone can be an NFC-enabled phone. Sending payment authorization for the total purchase amount from the point of sale device to a payment entity can include sending the payment authorization securely to the payment entity. The payment entity can be a person, a computer system, or a bank. The method can further include maintaining a shopping list on the mobile communication device of the user, in which the shopping list includes a listing of one or more items to be purchased by the user. The payment authorization can be an authorization for payment with a credit card, a debit card, or a prepaid card.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
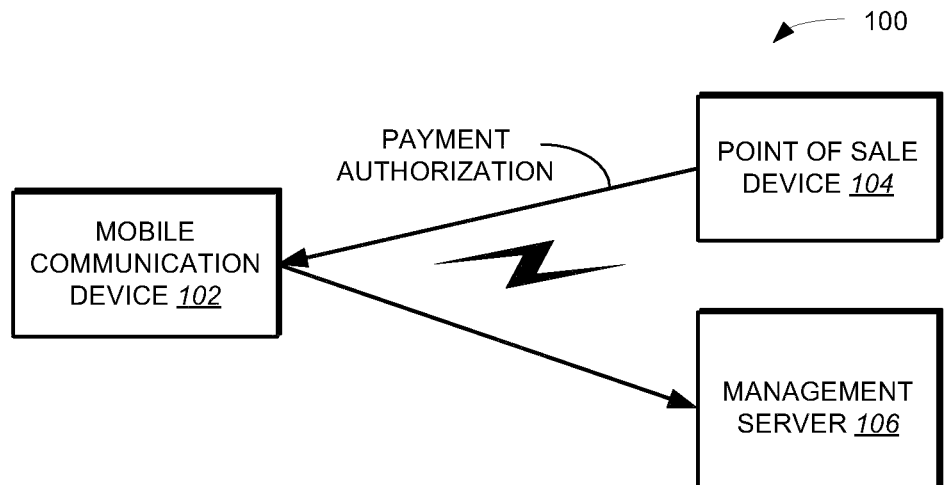
FIG. 1 illustrates a block diagram of a communication system including a wireless mobile communication device and a management server in accordance with one implementation.

FIG. 1 illustrates one implementation of a communication system 100. The communication system 100 includes a handheld, wireless mobile communication device 102 a point-of-sale device 104 and a management server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (e.g., receipts, tickets, coupons, etc.), storage of banking information (payment account numbers, security codes, PIN's, etc.), and accessing banking service (account balance, payment history, bill pay, fund transfer, etc.), and so on. The mobile communication device 102 can be a cellular phone, a wireless personal digital assistant (PDA), a laptop computer, or other wireless communication device. The point of sale device 104 can be a desktop computer, laptop computer, terminal, or other device that is configured to receive user input selecting items for purchase or other transaction.

In one implementation, authorizations for payment transactions that are made through the point of sale device 104 are sent from the point of sale device 104 to an issuer authorization (e.g., management server 106) through the mobile communication device 102 (as shown in FIG. 1). In one implementation, an issuer authorization is a payment entity that either approves or disapproves a payment transaction. An issuer authorization can be, e.g., a person, computer system, bank (or other third party). One potential benefit of having payment authorizations flow through the mobile communication device 102 is that sensitive user information (e.g. account numbers, pin numbers, and/or identity information) need only be sent from the mobile communication device 102 directly to an issuer authorization. Such operation reduces the potential for identity theft and/or fraudulent purchases made through a point of sale device. For example, (in one implementation) payment authorizations cannot be sent to an issuer authorization if the mobile communication device 102 is turned off.

Figure 2:
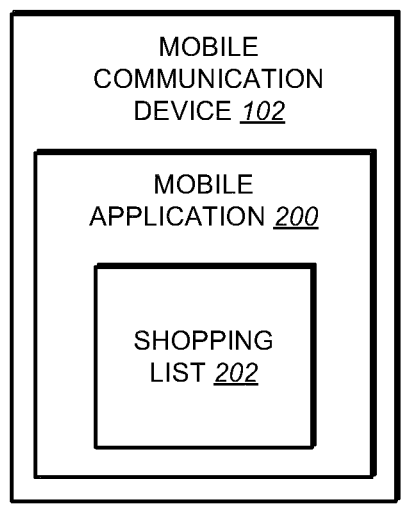
FIG. 2 illustrates one implementation of the wireless mobile communication device of FIG. 1.

FIG. 2 illustrates one implementation of the mobile communication device 102. The mobile communication device 102 includes a mobile application 200 that (in one implementation) is provided to the mobile communication device 102 through a remote server (e.g., management server 106). In one implementation, the mobile application is a Mobile Wallet application available from Mobile Candy Dish, Inc., of Alameda, Calif. In one implementation, the mobile application is a hosted service, as described in U.S. patent application Ser. No. 11/939,821, entitled "Method and System For Securing Transactions Made Through a Mobile Communication Device", which is incorporated herein by reference. In one implementation, the mobile application 200 is configured to send requests to the management server for artifacts based on user input, e.g., received through a keypad (not shown) of the mobile communication device 102. Requests to the management server 106 can also be automated, via proximity-based services, e.g., consumer tapping (or in close proximity) an LBS/contactless/RFID enabled phone against a smart poster (RFID/Bluetooth/LBS enabled, etc.), kiosk, or other device.

In one implementation, the mobile application 200 running on the mobile communication device 102 is configured to receive artifacts (e.g., advertisements, receipts, tickets, coupons, media, content, and so on) from the management server 106. In one implementation, the management server 106 sends artifacts to the mobile application based on user profile information and/or a transaction history (or payment trends) associated with a user of the mobile communication device 102 as described in U.S. patent application Ser. No. 11/944,267, entitled "Method and System For Delivering Information To a Mobile Communication Device Based On Consumer Transactions", which is incorporated herein by reference.

In one implementation, the mobile communication device 102 is an NFC-enabled phone. The mobile communication device 102 can be NFC-enabled, for example, through an embedded chip or a sticker that is affixed to the cellular phone, as described in U.S. application Ser. No. 11/933,321, entitled "Method and System For Adapting a Wireless Mobile Communication Device For Wireless Transactions", which is incorporated herein by reference. In one implementation, the NFC chip (or sticker) on the cellular phone can be used in conjunction with a merchant's point of sale device as described in greater detail below.

Figure 4:
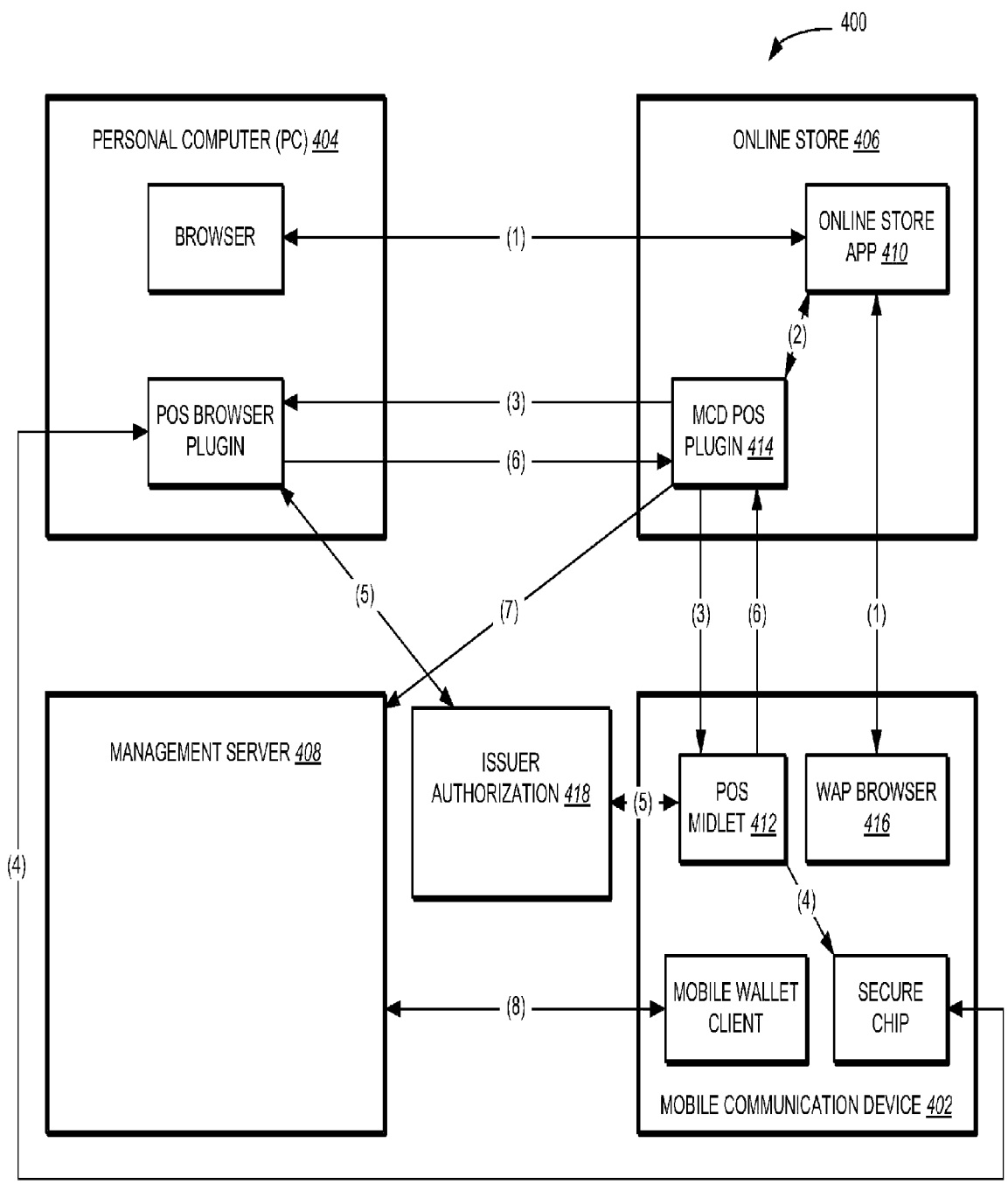
FIG. 4 illustrates a block diagram of a communication system including a wireless mobile communication device and an online store in accordance with one implementation.

For example, with reference to FIG. 4, in one implementation, the NFC chip (or sticker) on the cellular phone can communicate with NFC chips that are installed on the front of PC's (TV's, Kiosks, or any other device) and serve as scanners/readers. In this implementation a mobile candy dish applet (e.g., MCD POS plugin 414) is installed on the consumer's computer (e.g., PC 404) which interfaces with the NFC chip on the PC. When a consumer (or user) is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then waves their phone over the NFC reader present on the PC 404. The consumer's payment credentials are transferred from the phone to the merchant website (e.g., online store application 410) using a communication protocol between the chip in the phone and the chip in the PC, which can be radio frequency for example. If the consumer has coupons in their mobile wallet the consumer can either elect to manually apply the coupon, save the coupon for a future use (against a larger purchase for example), or have the coupon automatically applied during the transaction and the transaction amount is updated. After the consumer enters any necessary validation information (e.g., pin) to provide a multi-factor authentication and confirms the transaction, the online purchase is processed as normal by the merchant's online processor. The mobile wallet can retrieve transaction data, account balance from the management server 408.

In one implementation, the mobile communication device 102 is a non NFC-enabled phone. In this implementation, the consumer connects his phone to the PC 404 via some non radio frequency method (e.g., IR, Bluetooth, USB cable, etc.). When a consumer is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then pushes, e.g., a "Buy now" button and the consumer's payment credentials are transferred from the phone to the merchant website (e.g., online store application 410) using the protocol between the phone and the PC 404 which can be radio frequency, for example. If the consumer has coupons in their mobile wallet the consumer can either elect to manually apply the coupon, save the coupon for a future use, or have the coupon automatically applied during the transaction and the transaction amount is updated. After the consumer enters any necessary validation information (e.g., pin) to provide multi-factor authentication and confirms the transaction, the online purchase is processed as normal by the merchant's online processor. The mobile wallet can retrieve transaction data and account balance from the management server 408.

In one implementation, the management server 408 and merchant portal (e.g., online store 408) are maintained by trusted parties and use an encrypted tunnel to transfer financial data. When the consumer is ready to pay for their online product, they enter their cell phone number on the merchant portal. The merchant portal (which has an MCD applet (e.g., MCD POS plugin 414) installed on its server) securely connects to the management server 408 (that in one implementation is maintained by Mobile Candy Dish (MCD)). In one implementation, the management server 408 identifies the consumer through their cell phone number, and verifies the consumer's authenticity by sending a unique transaction code to the consumer mobile wallet on their cell phone. The consumer then enters this unique transaction code onto the merchant's web portal. The merchant portal sends this transaction number to the management server 408 for authentication. Upon authentication, the consumer's virtual wallet and payment methods (e.g., credit card, debit card, prepaid card, etc.) are securely retrieved from the management server 408 and are displayed to the consumer in a window on a website associated with the merchant portal. The consumer selects one of these payment methods to pay for their transaction. If a default card has been selected already, this step is not necessary. If the consumer has coupons in their mobile wallet the consumer can either elect to manually apply the coupon, save the coupon for a future use, or have the coupon automatically applied during the transaction and the transaction amount is updated. After the consumer enters any necessary validation information to provide a multi-factor authentication and confirms the transaction, the online purchase is processed as normal by the merchant's online processor. The mobile wallet can retrieve transaction data, account balance from the management server 408.

Referring to FIG. 2, in one implementation, the mobile application 200 maintains a shopping list 202 for a consumer. Accordingly, consumers have the ability to store their shopping list in their mobile wallet and add, delete, or change items on their shopping list either in offline or online mode. In one implementation, consumers are sent coupons based on items on their shopping list, preferences, previous shopping history, proximity to the physical retail store, or a combination of these parameters, as discussed in application Ser. No. 11/944,267, which is incorporated by reference above. If the consumer has coupons in their mobile wallet the consumer can either elect to manually apply the coupon, save the coupon for a future use, or have the coupon automatically applied during the transaction and the transaction amount is updated. When a consumer wants to order the items on their shopping list via an on online merchant (in contrast to a physical retail store), the consumer can logon to the merchant portal and electronically transmit their shopping list to the merchant portal either by waving their phone over NFC enabled PC's or some other connection such as IR, bluetooth, USB, or the like.

Figure 3:
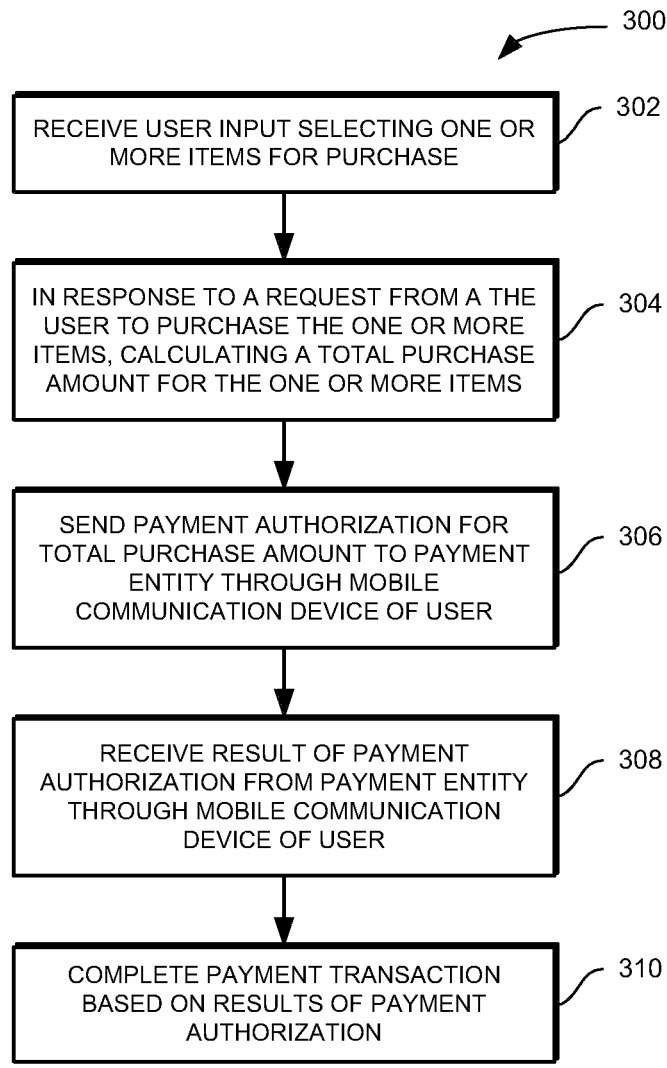
FIG. 3 is a method for conducting a payment transaction using a point of sale device in accordance with one implementation.

FIG. 3 illustrates a method 300 for conducting a payment transaction using a point of sale device (e.g., point of sale device 104). User input is received selecting one or more items for purchase (e.g., at the point of sale device) (step 302). In general, the transaction being made at the point of sale device can be any type of transaction that involves the exchange or transfer of funds—e.g., the transaction can be a payment transaction, a fund transfer, or other type of transaction. In response to a request from the user to purchase the one or more items, a total purchase amount for the one or more items is calculated (e.g., by the point of sale device) (step 304). If the user has coupons in their mobile wallet the user can either manually apply the coupon or have the coupon automatically applied during the transaction and the transaction amount is updated. The user request to purchase an item can be received, e.g., by a user clicking on a "buy now" icon that is displayed on a graphical user interface of the point of sale device. Payment authorization for the total purchase amount is sent to a payment entity through a mobile communication device of the user (step 306). A result of the payment authorization is received at the point of sale device from the payment entity via the mobile communication device (step 308). The payment transaction is completed based on the result of the payment authorization (step 310). If the payment transaction was authorized by the payment entity, then the sale of the items through the point of sale device is completed. Otherwise, if the payment transaction was not authorized by the payment entity, then the point of sale device terminates the payment transaction.

FIG. 4 illustrates an example payment transaction being made in a communication system 400 in accordance with one implementation. The communication system 400 includes a mobile communication device 402, a personal computer (PC) 404, an online store 406, and a core (or datastore) 408. As indicated by interaction (1), a user (or customer), using a phone (e.g., mobile communication device 402 or personal computer 404), browses an online store website (online store application 410) and finds an item that the customer wishes to purchase. This could also be a purchase made through a midlet application (POS midlet 412) residing on the mobile communication device 402. The user then goes to, e.g., a checkout of the online store 406 make a purchase. If the user has coupons in their mobile wallet the user can either manually apply the coupon or have the coupon automatically applied during the transaction and the transaction amount is updated. When it comes time to authorize the purchase, (in one implementation) the user is given an option to purchase with the mobile communication device 402. In one implementation, the mobile communication device 402 is an NFC-equipped phone (or NFC phone).

In interaction (2), when the user chooses to purchase with the mobile communication device 402, the online store application 410 sends the transaction information for authorization to the POS vendor plugin (e.g., MCD POS plugin 414). In one implementation, the POS vendor plugin is installed in the merchant's online store and enables the merchant to accepts MCD Blaze payments as an alternative form of payment, similar to accepting credit cards for payment. As shown by interaction (3), the POS vendor plugin formats, encrypts, and cryptographically signs the purchase authorization request which is sent via a secure SSL link (e.g., HTTPS, Bluetooth, IR, USB, or other suitable protocol) established by the browser/web application 416 back to the mobile communication device 402. As with the first scenario, all communications is over secure channels. (It may be required that the mobile wallet application be opened prior to beginning a phone online purchase.) The POS midlet 412 is a component of the mobile wallet application that executes PayPass or other payment authorization protocol between itself and the SE payment applications on the mobile communication device 402 (interaction (4)). The results of the request are sent back to the POS vendor plugin.

As shown by interaction (5), the POS midlet 412 then forwards the properly formatted authorization request to a payment entity (e.g., issuer authorization 418) for authorization. The results of the request are then sent back to the POS component of the mobile wallet. Through interaction (6), the POS midlet 412 then forwards the results back to the MCD POS plugin 414 to complete the purchase. The MCD POS plugin 414 then forwards the purchase transaction information to the management server 408 for later customer viewing (interaction (7)). As indicated by interaction (8), users (or customers) will then be able to query the management server 408 and immediately obtain purchase information, either by phone or PC.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 5:
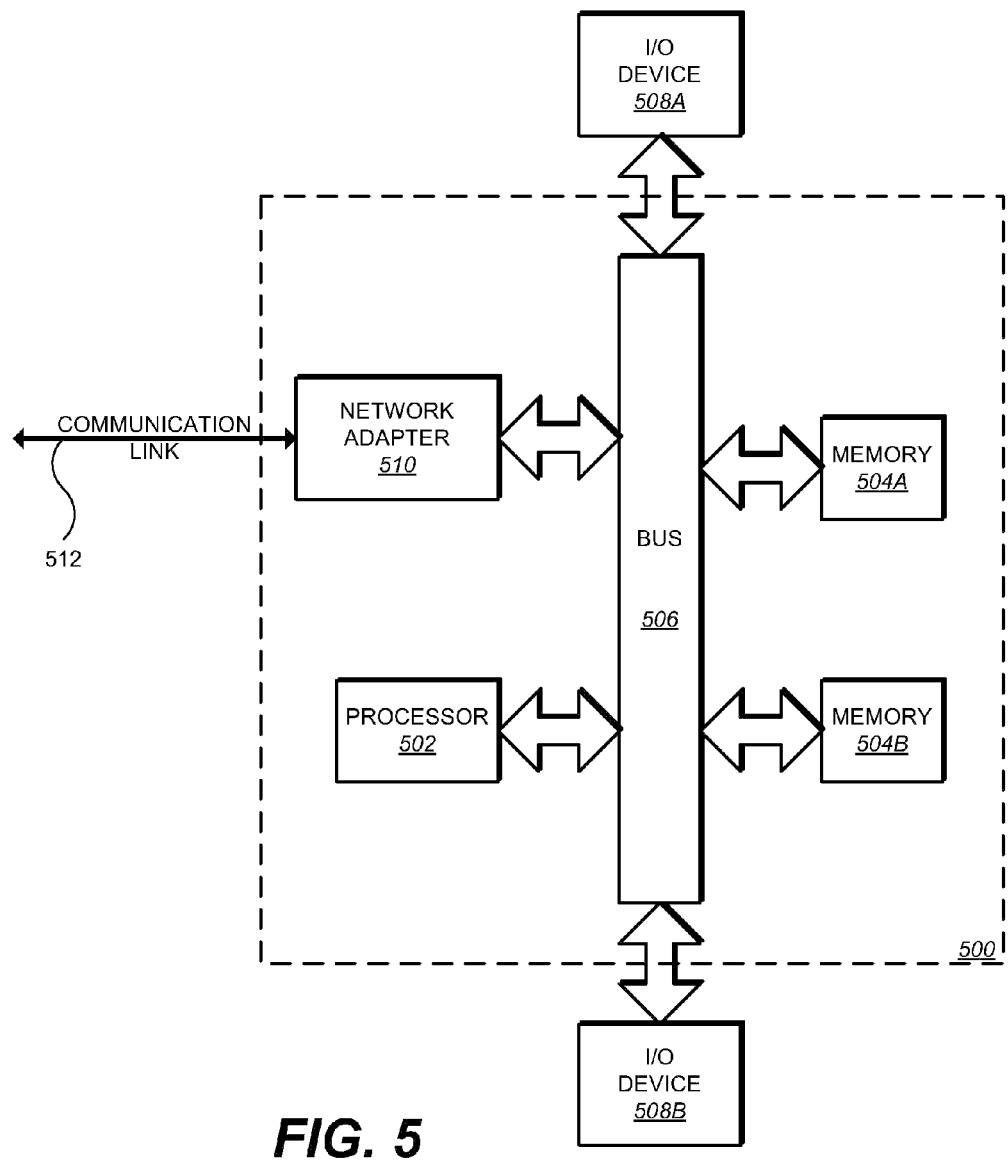
FIG. 5 is a block diagram of a data processing system suitable for storing and/or executing program code in accordance with one implementation.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A mobile device comprising:
   a mobile device display;
   a mobile device memory configured to maintain a non browser based mobile application, the mobile application including a virtual shopping list of items;
   a mobile device processor configured to execute the mobile application;
   a secure element coupled to the mobile device, the secure element including:
      a secure element memory storing a near field communication (NFC) application, the secure element memory configured to receive a user identification code and an item selection from the virtual shopping list of the mobile application; and
      a secure element processor configured to execute the NFC application, operating at an application layer above a physical layer in response to an NFC interaction triggered from a terminal NFC transceiver included in a point of sale (POS) terminal to the secure element, without communication with the mobile device, and
      wherein the NFC application transmits, using a first communication channel configured for NFC, transaction data including the user identification code and the selected item for purchase to the POS terminal for subsequent processing at a management server, the user identification code and selected item for purchase received from the mobile application prior to the NFC interaction.

2. The mobile device of claim 1, wherein the POS terminal is a desktop computer, a laptop computer, or a thin client, and wherein the POS terminal includes an NFC chip configured as an NFC scanner and an NFC reader.

3. The mobile device of claim 1, further comprising automatically applying a coupon during the near field communication transaction.

4. The mobile device of claim 1 further comprising sending a receipt, ticket, or coupon after the transaction from the management server to the mobile device.

5. The mobile device of claim 1, wherein the secure element is physically coupled to the mobile device but electrically decoupled from electrical interior components of the mobile device.

6. The mobile device of claim 1, wherein the secure element is physically coupled to the mobile device and electrically coupled to electrical interior components of the mobile device.

7. The mobile device of claim 1, wherein the secure element is included within the body of a memory card configured for placement in a memory card slot in the mobile device.

8. The mobile device of claim 1, wherein the secure element is embedded within the body of the mobile device.

9. The mobile device of claim 1, wherein a security tool is implemented at the mobile application, and wherein implementation of the security tool comprises prompting the user to login to the mobile device, using biometrics to authenticate the user before authorizing a transaction, disabling use of the mobile application, prompting the user to enter a payment limit PIN in response to a pending purchase exceeding a pre-determined amount, temporarily disabling the secure element, permanently disabling the secure element, deleting all cached data stored in the mobile device memory, and/or storing encrypted security codes on the mobile device, wherein disabling the secure element prevents near field communication payments, coupon redemption, and ticket redemption.

10. A method comprising:
    maintaining a non browser based mobile application in a mobile device memory included in a mobile device, the mobile application including a virtual shopping list of items, wherein the mobile application is associated with a near field communication (NFC) application stored in a secure element memory included in a secure element coupled to the mobile device, and wherein the NFC application is configured to receive a user identification code and an item selection from the virtual shopping list of the mobile application; and
    executing by a secure element processor included in the secure element the NFC application, operating at an application layer above a physical layer in response to an NFC interaction triggered from a terminal NFC transceiver included in a POS terminal to the secure element, without communication with the mobile device, and
    wherein the NFC application sends, using a first communication channel configured for NFC, transaction data including the user identification code and the selected item for purchase to the POS terminal for subsequent processing at a management server, the user identification code and the selected item for purchase received from the mobile application prior to the NFC interaction.

11. The method of claim 10, wherein the POS terminal is a desktop computer, a laptop computer, or a thin client, and wherein the POS terminal includes an NFC chip configured as an NFC scanner and an NFC reader.

12. The method of claim 10, further comprising automatically applying a coupon during the near field communication transaction.

13. The method of claim 10 further comprising sending a receipt, ticket, or coupon after the transaction from the management server to the mobile device.

14. The method of claim 10, wherein the secure element is physically coupled to the mobile device but electrically decoupled from electrical interior components of the mobile device.

15. The method of claim 10, wherein the secure element is physically coupled to the mobile device and electrically coupled to electrical interior components of the mobile device.

16. The method of claim 10, wherein the secure element is included within the body of a memory card configured for placement in a memory card slot in the mobile device.

* * * * *